United States Patent [19]

Franke et al.

[11] Patent Number: 5,242,977

[45] Date of Patent: Sep. 7, 1993

[54] POLY-α-OLEFIN/POLYURETHANE BLOCK COPOLYMERS, PROCESSES FOR THEIR PRODUCTION AND THEIR USE

[75] Inventors: Joachim Franke; Kurt P. Meurer, both of Cologne; Peter Haas, Haan; Josef Witte, Cologne, all of Fed. Rep. of Germany

[73] Assignee: Bayer Aktiengesellschaft, Leverkusen, Fed. Rep. of Germany

[21] Appl. No.: 810,645

[22] Filed: Dec. 19, 1991

Related U.S. Application Data

[60] Continuation of Ser. No. 538,369, Jun. 14, 1990, abandoned, which is a division of Ser. No. 68,282, Jun. 30, 1987, abandoned.

[30] Foreign Application Priority Data

Jul. 8, 1986 [DE] Fed. Rep. of Germany ....... 3622825

[51] Int. Cl.$^5$ .............................................. C08L 75/04
[52] U.S. Cl. .................................... 525/90; 525/125; 525/131
[58] Field of Search ........................... 525/90, 125, 131

[56] References Cited

U.S. PATENT DOCUMENTS

| | | | |
|---|---|---|---|
| 3,272,890 | 9/1966 | O'Leary | 260/859 |
| 3,432,451 | 3/1969 | Kales | 260/23 |
| 3,670,049 | 6/1972 | Stein et al. | 260/859 |
| 3,857,826 | 12/1974 | Greene et al. | 260/88.2 |
| 3,906,057 | 9/1975 | Durst | 260/876 |
| 3,928,281 | 12/1975 | Uchigaki et al. | 260/42.39 |
| 4,107,131 | 8/1978 | Gergen et al. | 260/40 |
| 4,206,102 | 6/1980 | Britain et al. | 260/28 |
| 4,940,755 | 7/1990 | Meier et al. | 525/90 |
| 4,990,557 | 2/1991 | Lee | 524/494 |

FOREIGN PATENT DOCUMENTS

| | | |
|---|---|---|
| 2309508 | 9/1973 | Fed. Rep. of Germany . |
| 2720534 | 11/1978 | Fed. Rep. of Germany . |
| 1330784 | 5/1963 | France . |
| 7025175 | 8/1970 | Japan . |
| 51-114438 | 10/1976 | Japan . |
| 56-033139 | 4/1981 | Japan . |
| 0001255 | 1/1985 | Japan ..................... 525/90 |
| 1070105 | 5/1967 | United Kingdom . |
| 1163266 | 9/1969 | United Kingdom . |
| 1181727 | 2/1970 | United Kingdom . |
| 1394459 | 5/1975 | United Kingdom . |

OTHER PUBLICATIONS

Polymer Alloys and Blends, Thermodynamics and Rheology, Leszek A. Utracki, Hanser Publischers, 1989, pp. 21–23 and 124–129.
Journal of Applied Polymer Science, 1986, No. 8, pp. 2523–2532.
Polymer Blends by D. R. Paul, 1978, pp. 48–57.
Patent Abstracts of Japan, JP PN 61–1422, vol. 10, No. 161, 1986.

Primary Examiner—Ana L. Carillo
Attorney, Agent, or Firm—Joseph C. Gil; Thomas W. Roy

[57] ABSTRACT

The present invention is directed to poly-α-olefin/polyurethane block copolymers which are prepared by reacting A) isocyanate-reactive functionalized poly-($C_2$–$C_{10}$-α-olefins) having a number average molecular weight $M_w$ of about 1000 to 350,000, B) polyisocyanates, isocyanate prepolymers or modified polyisocyanates, and, optionally, C) isocyanate-reactive synthesis units containing Zerewitinoff-active hydrogen atoms and having a molecular weight of 400 to about 5000 and, optionally, D) low molecular weight isocyanate-reactive chain extending agents having a molecular weight of 32 to 399.

The present invention is also directed to this process for preparing the poly-α-olefin/polyurethane block copolymers and to their use as polymer dispersants for the production of polymer blends, as primers or modifiers or for the production of moldings or coatings.

7 Claims, No Drawings

POLY-α-OLEFIN/POLYURETHANE BLOCK COPOLYMERS, PROCESSES FOR THEIR PRODUCTION AND THEIR USE

This application is a continuation of application Ser. No. 07/538,369, filed Jun. 14, 1990, now abandoned, which is a divisional of application Ser. No. 07/068,282, filed Jun. 30, 1987, now abandoned.

BACKGROUND OF THE INVENTION

1. Field of the Invention

This invention relates to new poly-α-olefin/polyurethane block copolymers (PAO/PU block copolymers), characterized in that they are synthesized from isocyanate-reactive functionalized poly-($C_2$–$C_{10}$-α-olefins) (hereinafter abbreviated to PAO), preferably polypropylene, di- or polyisocyanates or isocyanate prepolymers and polyols and/or low molecular weight chain extending agents.

The present invention also relates to a process for the production of the PAO/PU block copolymers and to their use as polymer dispersants for the production of polymer blends, as primers or modifiers or for the production of moldings or coatings.

2. Description of the Prior Art

Methods to obtain functionalized PAOs ly in the degradation of high molecular weight non-functional polyolefins in the presence of oxygen, air or ozone, or by grafting with unsaturated carboxylic acids or acid anhydrides, such as maleic acid anhydride for example. Carboxy-modified or carboxylic anhydride-modified PAOs such as these are known per se, but have never been used for the production of PAO/PU block copolymers.

By contrast, PAO/PU blends and mixtures formed solely by physical mixing and not by chemical linkage are known. For example, DE-A 2,720,534 describes PU/polyethylene or PU/polypropylene mixtures for insulating panels.

According to DE-A 2,309,508, polyurethanes having improved flex life are obtained by the addition of from 2 to 30% polyethylene or polypropylene. U.S. Pat. No. 3,670,049 claims inter alia polyethylene and polypropylene as lubricants for PU prepolymers.

U.S. Pat. No. 3,272,890 describes polyethylene or polypropylene molding mixtures containing from 15 to 25% of a thermoplastic polyurethane (TPU).

Polyolefin mixtures with polycondensates or polyurethanes are described in JA 25,175/70 (Toray).

In FR-A 2,163,530, GB-A 1,163,266, GB-A 1,181,727, DE-A 2,740,711/GB-A 1,070,105 and FR-A 1,330,784, polypropylene is modified inter alia by the addition of polyurethanes to improve its dyeability.

Polypropylene-modified PU (prepolymers) are described as hotmelt adhesives in DE-A 2,441,645, JA 56 033,139 and JA 51 114,438.

According to U.S. Pat. No. 3,432,451, polyurethanes are synthesized in the presence of a polyolefin and used as coatings and lacquers.

All of these patents are concerned with physical mixtures of the particular components. There are no covalent bonds between the polyolefins and the polyurethane segments. Accordingly, the basic incompatibility between these chemically very different polymer components cannot be eliminated. This is reflected, for example, in the inadequate mechanical properties of these blends.

According to the present invention, this problem is solved by chemical bond of the polyolefin (PAO) with the PU component. Accordingly, PAO/PU block copolymers such as these may be directly used as moldings or coatings, but more advantageously as primers or compatibility promoters.

SUMMARY OF THE INVENTION

The present invention is directed to poly-α-olefin/polyurethane (PAO/PU) block copolymers which are prepared by reacting A) isocyanate-reactive functionalized poly-($C_2$–$C_{10}$-α-olefins) having a weight average molecular weight Mw of about 1000 to 350,000, B) polyisocyanates, isocyanate prepolymers or modified polyisocyanates and, optionally, C) isocyanate-reactive compounds containing Zerewitinoff-active hydrogen atoms and having a molecular weight of 400 to about 5000 and, optionally, D) low molecular weight isocyanate-reactive chain extending agents having a molecular weight of 32 to 399, wherein at least one of the two isocyanate-reactive compounds C) or D) must be present.

The present invention is also directed to this process for preparing the poly-α-alkylolefin/polyurethane block copolymers and to their use as polymer dispersants for the production of polymer blends, as primers or compatibility modifiers or for the production of moldings or coatings.

DETAILED DESCRIPTION OF THE INVENTION

The present invention is directed to poly-α-olefin/polyurethane block copolymers (PAO/PU block copolymers), characterized in that they are obtained by the reaction of A) isocyanate-reactive functionalized poly-($C_2$–$C_{10}$-α-olefins) having a weight average molecular weight $M_w$ of about 1000 to 350,000, preferably about 2000 to 200,000 and more preferably about 2000 to 100,000, B) polyisocyanates, isocyanate prepolymers or modified organic di- or polyisocyanates and, optionally, C) isocyanate-reactive compounds having a molecular weight of 400 to about 5000 and containing Zerewitinoff-active hydrogen atoms, such as polyether polyols, polyester polyols, polycarbonate polyols, polylactones, amino group-containing modified polyols and, optionally, D) low molecular weight compounds having a molecular weight of from 64 to 399 as chain extending agents, for example organic di- or polyhydroxy compounds and di- and polyfunctional aminoalcohols or amines having a molecular weight in the range of from 32 to 399, in a single-stage or multi-stage process, wherein at least one of the two isocyanate-reactive compounds C) or D) must be present.

The isocyanate-reactive, functionalized poly-α-olefins (PAOs) mentioned in A) having a weight average molecular weight $M_w$ of about 1000 to 350,000, preferably about 2000 to 200,000 and most preferably about 2000 to 100,000 are polyolefins, preferably polypropylenes, which contain functional groups capable of reacting with isocyanate groups. A review of suitable functional groups can be found for example in Houben-Weyl, Supplementary Vol. 4, pp. 768–784. These functionalized PAOs are preferably poly-α-alkylolefin carboxylic acids, anhydrides, alcohols and amines. The polyolefins in A) are homopolymers or copolymers of $C_2$-$C_{10}$-α-olefins, preferably polypropylene.

Functionalized PAOs are known in principle. Thus, polypropylenes containing carboxylic acid groups may be obtained in accordance with U.S. Pat. Nos. 3,416,990, 3,437,550 and 3,483,276 by modifying crystalline or amorphous polypropylene with an ethylenically unsaturated carboxylic acid or polycarboxylic acid, anhydride, amide or alkylester. Examples of acids or anhydrides such as these are maleic acid, fumaric acid, itaconic acid, acrylic acid, methacrylic acid, crotonic acid, maleic acid anhydride or itaconic acid anhydride. Maleic acid anhydride is preferably used.

An example of a crystalline, carboxylated polypropylene polymer which may be used in accordance with the invention is Hercoprime G, obtainable from Hercules, Inc., Bloomington, Del. 19899. An example of an amorphous carboxylated polypropylene polymer is Epolene E 43, obtainable from Tennessee-Eastman Company, Tennessee.

Another method of obtaining functionalized polyolefins is described in German Patent Application P 36 18 378.4. This patent application describes a process for the production of poly-($C_2$-$C_{10}$-α-alkylolefin) dicarboxylic acids having molecular weights $M_w$ of about 70,000 to 350,000, preferably about 70,000 to 100,000, and most preferably about 70,000 to 80,000, characterized in that poly-($C_2$-$C_{10}$-α-olefins) having a $M_w$ of approximately 355,000 and a polydispersity $M_w/M_n$ of approximately 10 are oxidatively treated at about 200° to 300° C. and optionally degraded.

For example, 6000 g/h of isotactic polypropylene having a $M_w$ of 355,000 and a polydispersity $M_w/M_n$ of 10 may be introduced into an extruder (ZSK 32) having an LD (length-to-diameter ratio) of 40, heated to 250°-260° C. and mixed with 1500 normal liters/hour (Nl/h) air under pressure, the cylinder temperature of the extruder being kept at about 210° C. after the zone where the air is introduced. ($M_w$=weight average molecular weight; $M_n$=number average molecular weight).

In the degassing zone, the excess air escapes and the polypropylene carboxylic acid obtained is extruded through the nozzle. After this first oxidation, the resulting polypropylene carboxylic acid has a $M_w$ of about 113,000, a polydispersity of 5 and a carboxyl group content of 0.7 carboxyl groups per molecule.

This product may again be oxidatively extruded in the same way, resulting in a polypropylene carboxylic acid having a $M_w$ of 94,000, a polydispersity of 4 and a carboxyl group content of 1.3 carboxyl groups per molecule.

This product may be oxidatively extruded a third time. The resulting polypropylene carboxylic acid has a $M_w$ of 70,000, a polydispersity of 5 and a carboxyl group content of 1.5 to 2 carboxyl groups per molecule.

The carboxyl group content is determined by acidimetric titration using a methanolic potassium hydroxide solution. The oxidative extrusion is preferably carried out under pressures of about 1 bar to 100 bar.

This oxidation process according to the above-cited patent application to form polyolefin carboxylic acids may also be carried out in a kneader at temperatures of about 150° to 300° C. using reaction times of about 1 to 1000 minutes, preferably 10 to 1000 minutes, with air throughputs of about 10 to 1000 l/h, and pressures of about 1 to 100 bar.

The above-cited application also relates to a process for the production of poly-($C_2$-$C_{10}$-α-olefin) carboxylic acids, characterized in that $C_2$-$C_{10}$ olefins are polymerized in known manner with known organometallic mixed catalysts, for example vanadium (III) organic compounds and aluminiumalkylhalides especially vanadium (acetylacetonate)$_3$/Al (Cl) ($C_2H_5$)$_2$, to molecular weights $M_3$ of about 50,000 to 350,000 and then treated with $CO_2$ for 6 to 20 hours at temperatures of about $-50°$ to $-70°$ C. under a $CO_2$ pressure of up to about 5 bar. The reaction mixture is subsequently acidified with aqueous acid and the polyolefin carboxylic acid obtained is separated off.

The PAO carboxylic acids or PAO carboxylic acid anhydrides may then be directly reacted with isocyanate groups. The reaction of isocyanate groups containing compounds with low molecular weight carboxylic acids or carboxylic acid anhydrides is known in principle and is described, for example, in R. L. Zapp, G. E. Serniuk, K. S. Mickler, Rubber Chem. Technol. 43, 1154 (1970); S. Motoki, T. Saito, H. Kagami, Bull. Chem. Soc. Jpn. 47, 775 (1974); C. Naegli, A. Tyabij, Helv. Chim. Acta. 17,931 (1934).

Depending on how the reaction is conducted, either hydroxamic acid anhydrides (formula I)

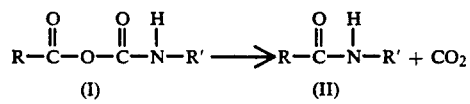

or with elimination of $CO_2$, amide linkages (formula II) are obtained.

Reaction of functionalized PAO with mono- or polyisocyanates or isocyanate prepolymers to form isocyanate-group-containing PAO and the resulting preparation of PAO/PU block copolymers showing the properties advantageously obtainable in accordance with the invention is new.

However, the above-mentioned PAOS carboxylic acids or PAOS carboxylic acid anhydrides may also first be converted into other isocyanate-reactive groups by known organochemical reactions which have not been used for functionalized PAOs. Conversion into alcohol groups, amino groups, epoxide groups etc. is mentioned by way of example without limiting the invention in any way.

This conversion of the carboxylic acid groups or anhydride groups may be effected either directly by reduction or rearrangement into other NCO-reactive groups or by reaction of the PAO-carboxylic acid or anhydride groups with other low molecular weight or high molecular weight, at least bifunctional compounds corresponding to the formula

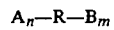

wherein

R is an organic radical, for example an alkyl, aralkyl, or aryl radical having a molecular weight of 14 to about 1000, A is a functional group capable of reacting with carboxylic acid groups or anhydride groups, such as hydroxyl or amino groups, thus forming ester, amide or imide bonds, B is a functional group capable of reacting with isocyanate groups, such as the groups set forth in Houben-Weyl E4, pp. 768-784, preferably hydroxy, amino, thio and epoxide groups, $n \leq 1$ and
$m \geq 1$ Examples of these compounds include diols, polyols and aminoalcohols such as ethylene glycol, 1,4-butanediol, 2,2-dimethyl-1,3-propanediol, ethanolamine, diethanolamine, etc.

The reactivity of the polyolefin carboxylic acid groups may have to be increased for this reaction to be successfully performed. Any of the activating agents normally used in organic chemistry may be used for this purpose. Conversion into carboxylic acid halides is preferred. Conversion into carboxylic acid chlorides is particularly preferred.

These polyolefin carboxylic acid chlorides may be obtained in accordance with the already cited German Patent Application (P 36 18 378) by reaction of polyolefin carboxylic acids having a $M_w$ of about 1000 to 350,000 with halogenating agents, preferably with chlorinating agents such as thionyl chloride, optionally in organic solvents such as aliphatic, cycloaliphatic or aromatic solvents. Organic solvents are, preferably, halogenated or alkylated aromatic hydrocarbons such as toluene or chlorobenzene. In the absence of solvents, the halogenation takes place as such using a suspension of the carboxylic acid in the halogenating agent.

Organic polyisocyanates B) suitable for preparing the PAO/PU block copolymers by reaction with the functionalized PAO according to the invention are any organic compounds containing at least two free isocyanate groups. It is preferred to use diisocyanates $X(NCO)_2$ where X is in particular an aliphatic hydrocarbon radical containing 4 to 12 C-atoms, a cycloaliphatic hydrocarbon radical containing 6 to 15 C-atoms, an aromatic hydrocarbon radical containing 6 to 15 C-atoms or an araliphatic hydrocarbon radical containing 7 to 15 C-atoms.

Examples of particularly preferred diisocyanates include tetramethylene diisocyanate, hexamethylene diisocyanate, dodecamethylene diisocyanate, 1,4-diisocyanato-cyclohexane, 1-isocyanato-3,3,5-trimethyl-5-isocyanatomethyl cyclohexane, 4,4'-methylene-bis-cyclohexyl diisocyanate, 4,4'-diisocyanato-2,2-dicyclohexyl propane, 1,4-diisocyanatobenzene, 2,4-diisocyanatotoluene and/or 2,6-diisocyanatotoluene, 4,4'-diisocyanatodiphenylmethane, p-xylylene diisocyanate, $\alpha,\alpha,\alpha',\alpha'$-tetramethyl-m- or -p-xylylene diisocyanate and mixtures of these diisocyanates because thermoplastic block copolymers are formed therefrom.

It is of course also possible to use the polyisocyanates of higher functionality known per se from polyurethane chemistry or even modified polyisocyanates known per se, for example polyisocyanates containing carbodiimide groups, allophanate groups, isocyanurate groups, urethane groups and/or biuret groups, either exclusively or in admixture with the diisocyanates.

The isocyanate-reactive polyols containing Zerewitinoff-active hydrogen atoms suitable as starting material (C) for the production of PAO/PU block copolymers according to the invention are synthesis units known per se from polyurethane/polyurea chemistry having molecular weights of 400 to about 5000 such as polyether polyols, polyester polyols, polycarbonate polyols, polylactones and amino group-containing modified polyols. In this case, too, difunctional compounds are particularly preferred.

The compounds serving as chain extenders which are suitable as starting material D) for the production of the PAO/PU block copolymers according to the invention are organic polyhydroxy compounds having a molecular weight of 62 to 399. The chain extenders are preferably difunctional and have a molecular weight 62 to 399, preferably 62 to about 250. While trifunctional chain extending agents are less preferred, they may be co-used in small quantities with the difunctional chain extenders.

Suitable compounds include in particular, simple polyhydric alcohols such as ethylene glycol, 1,2-propanediol, 1,3-propanediol, 1,4-butanediol, 1,6-hexanediol, trimethylol propane or glycerol. Low molecular weight polyester diols such as adipic acid-bis-(hydroxyethyl)-ester; low molecular weight diols containing ether groups such as diethylene glycol, triethylene glycol, tetraethylene glycol, dipropylene glycol, tripropylene glycol or tetrapropylene glycol; and also difunctional or polyfunctional amines having a molecular weight of 32 to 399 may also be used as chain extending and crosslinking agents.

Compounds C) and D) are described in detail in DE-A 2,832,253 (U.S. Pat. No. 4,263,408, herein incorporated by reference in its entirety), pages 11 to 20.

Rhein and Ingham (Polym. Prep. Amer. Chem. Soc. Div. Polym. Chem. 15 (1974) 60-65 and Polymer 16, (1975), 799-804) describe the production of prepolymers, ethylene-propylene copolymers or atactic propylene homopolymers by controlled subsequent introduction of double bonds and subsequent ozonolysis. The terminal groups formed are converted into OH groups with alkyl aluminum hydride reagents. These OH-functional prepolymers may be subsequently crosslinked with diisocyanates.

These products differ from the PAO/PU block copolymers according to the invention in that there is no proportional co-use of organic polyhydroxyl compounds having a molecular weight of 62 to about 5000 and/or no use of alcoholic, aminic or hydrazinic chain extending or crosslinking agents. Accordingly, there can be no formation of relatively long and significant PU segments or domains in the products described in Rhein and Ingham although this is crucial to compatibility with polyurethanes. However, it is precisely these segments or domains which are essential according to the invention for achieving the desired properties of the compatibility-promoting PAO/PU block copolymers. In addition, this method described by Rhein et al is not workable on an industrial scale because the metal hydrides are difficult to separate after the reaction and their activity to isocyanates would be a problem, quite apart from their high cost.

By dispensing with the polyols serving as flexibilizing soft segments in accordance with the invention, whether in the form of the segments C) or in the form of NCO prepolymers B) based on relatively high molecular weight polyols, rigid crosslinked, non-melting and thermoplastically non-formable and non-processible products are obtained by the process described by Rhein and Ingham. However, it is precisely the thermoplastic properties of the PAO/PU block copolymers according to the invention that are crucial to their use as dispersants and primers for the production of polymer blends.

The present invention also relates to a process for the production of poly-α-olefin/polyurethane (PAO/PU) block copolymers, characterized in that A) isocyanate-reactive, functionalized poly-($C_2$–$C_{10}$-α-olefins) having a $M_w$ of about 1000 to 350,000 are reacted, optionally in stages, with

B) organic di- or polyisocyanates, modified polyisocyanates or isocyanate prepolymers based on relatively high molecular weight polyols (C), and, optionally, C) isocyanate-reactive synthesis units containing Zerewitinoff-active hydrogen atoms having a molecular weight of 400 to about 5,000 such as polyether polyols, polyester polyols, polycarbonate polyols, polylactones, amino group-containing modified polyols and, optionally, D) low molecular weight compounds having a molecular weight of 62 to 399 as chain extending agents such as organic di- or polyhydroxy compounds and di- and polyfunctional amines having a molecular weight of 32 to 399 as chain extending or crosslinking agents wherein at least one of the two isocyanate-reactive compounds C) or D) must be present.

One of the embodiments of the process according to the invention for the production of PAO/PU block copolymers is a process which is characterized in that the functional PAOs A) are first reacted with the di- or polyisocyanates or with the isocyanate prepolymers B) in the melt or in the presence of an inert organic solvent (such as acetone, N-methyl pyrrolidone, toluene, chlorobenzene, dichlorobenzene, etc.) to form a prepolymer still containing free isocyanate groups; the remaining free NCO groups are completely or partly reacted in a second step with the organic polyhydroxy compounds C) having a molecular weight of 400 to about 5000 and any remaining free isocyanate groups are optionally reacted in a third step with organic di- or polyhydroxy compounds D) having a molecular weight of 62 to 399 and/or with aminic or hydrazinic chain extending or cross-linking agents having a molecular weight of 32 to 399.

Another embodiment of the process for the production of PAO/PU block copolymers is characterized in that the functional PAOs A) are first reacted with the di- or polyisocyanates or with the isocyanate prepolymers B) in the melt or in the presence of an inert organic solvent (such as acetone, N-methyl pyrrolidone, toluene, chlorobenzene, dichlorobenzene, etc.) to form a prepolymer still containing free isocyanate groups and, in a second step, the remaining free NCO groups are completely reacted with a mixture of the organic polyhydroxy compounds C) having a molecular weight of 400 to about 5000 and the organic di- or polyhydroxy compounds D) having a molecular weight of 62 to 399 and/or aminic or hydrazinic chain extending or crosslinking agents having a molecular weight of 32 to 399.

The present invention also relates to a process for the production of PAO/PU block copolymers which is characterized in that the di- or polyisocyanates B) are first reacted with the organic polyhydroxy compounds C) having a molecular weight of 400 to about 5000 in the melt or in the presence of an inert organic solvent such as acetone, N-methyl pyrrolidone, toluene, chlorobenzene, dichlorobenzene, etc. to form a prepolymer still containing free NCO groups and, in a second step, the remaining free NCO groups are completely or partly reacted with the functionalized PAOs A) and, in a third step, any remaining free NCO groups are optionally reacted with organic di- or polyhydroxy compounds D) having a molecular weight of 62 to 399 and/or aminic or hydrazinic chain extending or crosslinking agents having a molecular weight of 32 to 399.

In the process for the production of PAO/PU block copolymers, the functional polypropylene carboxylic acids may first be converted into the polypropylene carboxylic acid halides, more especially chlorides (as in German patent application P 36 18 378.4) and, finally, reacted with aliphatic diols, preferably ethylene glycol, butanediol or hexanediol, in the melt or in an inert organic solvent such as toluene to form a hydroxyalkyl polypropylene carboxylic acid ester as functional PAOs.

Hydroxy-functional polypropylene carboxylic acid derivatives are also preferably obtained by the reaction of functional polypropylene carboxylic acid anhydrides with aminoalcohols, preferably ethanolamine, in an inert solvent which preferably forms an azeotrope with water and azeotropically removing water to form hydroxyalkyl polypropylene carboxylic acid diimides.

These hydroxy-functional polypropylene carboxylic acid derivatives are then reacted with isocyanates, preferably diphenylmethane diisocyanate, naphthylene diisocyanate, toluylene diisocyanate, isophorone diisocyanate or hexamethylene diisocyanate, more preferably diphenylmethane-4,4-diisocyanate, in an inert solvent at about 50° to 150° C., preferably about 70° to 120° C. or in the melt at about 100° to 200° C., preferably about 130° to 170° C. to form NCO prepolymers and the NCO prepolymers thus formed are subsequently reacted with a chain extending agent such as butanediol, hexanediol, more preferably butanediol, and/or relatively high molecular weight polyhydroxyl compounds C), in a quantity substantially equivalent to the quantity of NCO present. The mixture may then be kept at the temperature indicated until no more free NCO can be analytically detected.

In another preferred process, the above-mentioned NCO prepolymers of the hydroxy-functional PP carboxylic acid esters or imides may first be reacted with organic polyhydroxy compounds having a molecular weight of 400 to about 5000, preferably with polyesters, polypropylene glycol ether or poly(tetramethylene)-glycol ether having a molecular weight of about 1000 to 3000 in such a quantity that, on completion of this reaction, free isocyanate groups are still present. The free isocyanate groups are then reacted as described above with a substantially equivalent quantity of a chain extending agent. The polyesters preferably used are aliphatic or aliphatic-aromatic linear polyesters of dicarboxylic acids and diols, of the type normally used for thermoplastic polyurethanes.

In another preferred process for the production of functionalized PAO-NCO prepolymers, the PAOs carboxylic acids or anhydrides (preferably polypropylene carboxylic acid or anhydrides) are directly reacted with the aromatic or aliphatic isocyanates, preferably diphenylmethane diisocyanate or toluylene diisocyanate or NCO prepolymers thereof, in a high-boiling solvent or preferably in the melt at a temperature above the melting point of the PAO (preferably PP) carboxylic acid or anhydride (i.e. above about 150° C. but to avoid unwanted secondary reactions, not significantly above the melting point, i.e. below about 200° C.). In this reaction, amide bonds of the polypropylene residue to the diisocyanate are formed with elimination of $CO_2$ in accordance with formula (II). After the evolution of $CO_2$ has stopped, the reaction mixture may be further processed by one of the variants mentioned above. The particular advantage of conducting the reaction in this way lies in the simplicity of the procedure and in the elimination of the preliminary stages for the preparation of the hydroxy-functional PAO (preferable PP) carboxylic acid esters or imides.

White to pale yellowish, crystalline or amorphous solids which melt at about 150° to 200° C. without decomposition are obtained in these processes. Thermoanalytical investigations reveal the presence of undisturbed crystallizations of the PAO and PU segments. IR-spectra show both the signals for the functional PAOS and also the characteristic absorption bands for urethane and amide bonds. A considerable proportion of block copolymers may be detected, while only negligible quantities of pure PAO (polypropylene) or pure PU may be isolated by the method of separating liquids (cf. R. Kuhn, Makromol. Chem. 181. 725 (1980)).

The reactions take place at a temperature of about 20° to 200° C., preferably about 50° to 190° C. The standard catalysts normally used for isocyanate reactions may optionally be used in quantities of about 0.1 to 10%, based on the total quantity of reactants. The described reactions are complete when no more free isocyanate groups can be analytically detected (IR).

The optionally dissolved PAO/PU block copolymers are isolated in known manner either by removal of the solvent, preferably in vacuo, at elevated temperature or by precipitation of the solution by the use of a solvent in which the polymer is insoluble.

To complete the reaction and to improve the mechanical properties of the end product, it may be advisable to condition the PAO/PU block copolymers according to the invention for about 0.1 to 24 h, preferably about 1 to 5 h at a temperature of about 50° to 150° C., preferably about 70° to 120° C.

After purification and drying and, optionally, conditioning, the PAO/PU block copolymers obtainable in accordance with the invention may be processed in standard mixing units, such as mixing rolls, kneaders, single-screw and multiscrew extruders and Brabender mixers, to form moldings. The processing temperature should preferably not exceed about 250° C.

The PAO/PU block copolymers according to the invention may also be mixed in any ratio with thermoplastic polyurethanes, such as Desmopan, a product of Bayer AG, or with isotactic and/or atactic polypropylenes such as Vestolen, a product of Huls AG.

In this case, the PAO/PU block copolymers according to the invention may be used with particular advantage as primers, compatibility promoters or dispersants in otherwise incompatible or poorly compatible thermoplastic polymer mixtures such as polypropylene/thermoplastic polyurethane elastomer blends.

The technological advance which may be achieved by using the PAO/PU block copolymers according to the invention may be demonstrated by measurement of the torsional separation strength between polypropylene and polyurethane sandwich panels. When a mixture of polypropylene (PP) and PU is used as the adhesive layer between such panels, a torsional separation strength of 8 MPa is obtained in this comparative test. An addition of 10% of the PAO/PU block copolymers according to the invention to the adhesive layer increases the torsional separation strength to 13 MPa. For comparison, the torsional separation strength between two polypropylene panels is 4 MPa and between two PU panels is 16 MPa. The comparative procedure adopted is to bond two panels of the pure materials with a mixture of PU and PP (1:1) by fusion bonding; whereas, in the test according to the invention the block copolymer of Example 4 is added in a quantity of 10% to the PP/PU mixture as polymer dispersant and bonded by holding for 15 minutes at 240° C.

The torsional separation strength imparted by the PAO/PU block copolymer is reflected in considerably increased compatibilizing of the PP and PU materials because the strength is increased by 60%.

The effect of the PAO/PU block copolymers according to the invention as polymer dispersants is also apparent when PP/PU blends are viewed under an optical microscope. Whereas, in the absence of polymer dispersants, an irregular distribution consisting of more or less large units of PU and PP is observed in these blends, the phases are made uniform and smaller by addition of the PAO/PU block copolymers according to the invention.

The invention is further illustrated, but is not intended to be limited by the following examples in which all parts and percentages are by weight unless otherwise specified.

EXAMPLES

Example 1

Preparation of the PP carboxylic acids (in accordance with German Patent Application P 36 18 378.4)

6000 g/h isotactic polypropylene having a weight average molecular weight of 340,000 were introduced into an extruder (Werner u. Pfleiderer ZSK 32) with a length-to-diameter ratio (LD) of 40, heated to 250°-260° C. and mixed with 1500 Nl/h air under pressure.

After the zone where the air was introduced, the cylinder temperature of the extruder was kept at 210° C. In the degassing zone, the excess air escaped and the degraded polypropylene was extruded through the nozzle.

Carboxy-functionalized polypropylene having a molecular weight of approx. 80,000 and a functionality of approx. 1 was obtained. Accordingly, the substance had an acid number of approx. 0.7 g KOH/g substance.

EXAMPLE 2

Preparation of the hydroxy-functional PP carboxylic acid esters 100 g isotactic polypropylene degraded by thermal oxidation (acid number approx. 0.7 mg KOH/g substance) were dissolved in 200 ml abs. toluene and refluxed for 2 hours with 20 g (excess) thionyl chloride. Unused thionyl chloride and some toluene was distilled off in vacuo. The quantity of toluene removed was added again and 20 g of ethylene glycol were added to the acid chloride. After another 3 hours under reflux, the product was precipitated in an excess of methanol, filtered under suction, washed with methanol and dried.

EXAMPLE 3

Preparation of the bis-(hydroxyimide) of Epolene E 43 polymer (a product of Tennessee-Eastman)

45 g (0.01) Epolene E 43 polymer and 1.22 g (0.02) ethanolamine were refluxed for 2 hours in 100 ml toluene in a water separator. The product was then precipitated in methanol, filtered under suction, washed and dried.

OH number = 24 mg KOH/g substance (theor. 22.5).

EXAMPLE 4

Preparation of the PAO/PU block copolymers 80 g of the hydroxy-functional polypropylene of Example 2 were dissolved in toluene and reacted with 25 g diphenylmethane diisocyanate (MDI) in the quantity calculated for the intended quantity of PU component. After 2 hours at 80° C., a stoichiometric quantity of 1,4-butanediol was slowly added, followed by stirring for 12 hours at 80° C. until no more free isocyanate could be detected. The product was precipitated in methanol, filtered under suction, washed and dried.

EXAMPLE 5

The hydroxy-functional PP carboxylic acid esters or imides of Examples 2 or 3 were dissolved in toluene and reacted with toluylene diisocyanate (2,4-toluylene diisocyanate) in the quantity calculated for the intended quantity of PU component NCO/OH-ratio=100/1. After 2 hours at 80° C., a polyester of adipic acid and hexanediol (OH number 56, molecular weight 2000) was slowly added in half the quantity stoichiometrically corresponding to the free isocyanate group content. After 2 hours at 80° C., 1,6-hexanediol was slowly added in the quantity corresponding to the remainder of free isocyanate groups, followed by stirring for 12 hours at 80° C. until no more free isocyanate could be detected. The product was precipitated in methanol, filtered under suction, washed and dried.

EXAMPLE 6

100 g of the polypropylene carboxylic acid of Example 1 (acid number 0.7) were melted under nitrogen at 150° C. 25 g MDI were then slowly added at that temperature. There was an evolution of gas ($CO_2$) which stopped after about 15 minutes. After another 30 minutes, 112 g of a polyester of adipic acid and butanediol (OH number 50 mg KOH/g substance) were added, followed by stirring for another 2 hours at 150° C. 4.5 g butanediol were then added to this NCO prepolymer containing polypropylene blocks, followed by rapid stirring, after which the mixture was poured into a Teflon pan and held for 2 hours at 80° C.

EXAMPLE 7

450 g (0.1) Epolene E 43 polymer were melted at 160° C., followed by the gradual addition of 34.8 g (0.2) 2,4-toluylene diisocyanate. Evolution of $CO_2$ was observed and slowly abated. After 30 min., 9 g of butanediol were added, followed by rapid stirring. The product solidified and was then held for 2 hours at 80° C.

EXAMPLE 8

Preparation of the PP carboxylic acids by thermal oxidation in an autoklave 15.000 g isotactic polypropylene having a weight average molecular weight of 340.000 were introduced in an autoklav (45 l). It is heated to 220° C. and mixed with 600 l/h air under pressure (1,5 bar). The mixture is stirring for 12 hours. Carboxyfunctionalized polypropylene having a molecular weight $M_w$ of approximately 2.000 and a functionality of 2-2.5 was obtained.

EXAMPLE 9

1.050 g of the polypropylene carboxylic acid of Example 10 were melted under nitrogen at 150° C. 323 g methanediphenyldiisocyanate were then added at that temperature. There was an evolution of gas ($CO_2$). After about two hours 1.627 g of a polyester of adipic acid and butanediol (molecular weight $M_w$ about 2250) were added, followed by stirring for 10 minutes at 160°–170° C. Increasing of viscosity was observed and the product was poured into a Teflon-pan and held for two hours at 120° C.

EXAMPLE 10

Mixing of the PAO/PU block copolymers with Vestolen 5200 (Huls AG) polymer and Desmopan thermoplastic (Bayer AG)

Brabender Plastograph, Brabender OHG, Duisburg Model 82 II 00 No. 179535

| Procedure: | temperature | = 240° C. (±5° C.) |
|---|---|---|
| | quantity | = 50 g |
| | compounding time | = 15 mins. |
| | r.p.m. | = 25. |

The compounded samples were removed with a spatula while still hot and soft and dried in vacuo for 1 hour at 130° C. Whereas, in the absence of polymer dispersants, an irregular distribution consisting of more or less large units of PU and PP is observed in these blends, the phases are made uniform and smaller by addition of the PAO/PU block copolymers according to the invention.

EXAMPLE 11

Measurement of torsional separation strength

Sandwich samples of PU (Desmopan 359 thermoplastic, Bayer AG) and PP (Vestolen 5200 polymer) were prepared using an intermediate film of 100–200 μm thickness by pressing for 15 minutes at 240° C. in a heating press.

When the intermediate film consisted of a PU/PP blend (ratio by weight 1:1), a separation strength of 8 MPa was measured. When 10% of the PP/PU block copolymer of Example 4 was added to the PU/PP blend for the intermediate film, a torsional separation strength of 13 MPa was obtained.

For comparison: the strength of a sandwich panel of two identical Desmopan thermoplastic PU elastomer panels (Bayer AG, D 5090 Leverkusen) was approx. 16 MPa; the strength of a sandwich panel of two identical Vestolen polymer panels was 4 MPa.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition which comprises polypropylene, a thermoplastic polyurethane and a poly-($C_2$–$C_{10}$-α-olefin)/polyurethane (PAO/PU) block copolymer which comprises the reaction product of
   A) an isocyanate-reactive poly-($C_2$–$C_{10}$-α-olefin) having a $M_w$ of about 1000 to 350,000, the isocyanate-reactive group comprising a member selected from the group consisting of carboxyl groups, carboxylic acid anhydride groups, hydroxy-functional carboxylic acid esters and hydroxy-functional carboxylic acid imides,
   B) an organic polyisocyanate containing at least two free isocyanate groups,
   C) optionally a compound containing isocyanate-reactive groups and having a molecular weight of 400 to 5000, other than said isocyanate-reactive poly-($C_2$–$C_{10}$-α-olefin) of component A), and D) optionally a low molecular weight isocyanate-reactive compound having a molecular weight of 32 to 399, wherein at least one of components C) or D) must be present.

2. The composition of claim 1 wherein component A) comprises an isocyanate-reactive polypropylene.

3. The composition of claim 1 wherein component A) comprises a polypropylene containing one or more carboxyl groups.

4. The composition of claim 1 wherein component A) comprises a polypropylene containing one or more carboxylic acid anhydride groups.

5. The composition of claim 1 wherein component A) comprises a hydroxy-functional polypropylene carboxylic acid ester.

6. The composition of claim 1 wherein component A) comprises a hydroxy-functional polypropylene carboxylic acid imide.

7. The composition of claim 1 wherein said PAO/PU block copolymer is present in an amount of about 0.1 to 20% by weight, based on the weight of said composition.

* * * * *